(12) United States Patent
Kattepur

(10) Patent No.: US 11,100,443 B2
(45) Date of Patent: Aug. 24, 2021

(54) METHOD AND SYSTEM FOR EVALUATING PERFORMANCE OF WORKFLOW RESOURCE PATTERNS

(71) Applicant: Tata Consultancy Services Limited, Mumbai (IN)

(72) Inventor: Ajay Kattepur, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/825,990

(22) Filed: Mar. 20, 2020

(65) Prior Publication Data

US 2020/0311628 A1   Oct. 1, 2020

(30) Foreign Application Priority Data

Mar. 28, 2019   (IN) .............................. 201921012190

(51) Int. Cl.
*G06Q 10/06* (2012.01)

(52) U.S. Cl.
CPC ..... *G06Q 10/0633* (2013.01); *G06Q 10/0639* (2013.01); *G06Q 10/06311* (2013.01); *G06Q 10/06375* (2013.01)

(58) Field of Classification Search
CPC ......... G06Q 10/0633; G06Q 10/06311; G06Q 10/06375; G06Q 10/0639

(Continued)

(56) References Cited

U.S. PATENT DOCUMENTS

| 2006/0224432 A1* | 10/2006 | Li ....................... G06Q 10/1095 705/7.21 |
| 2009/0171708 A1* | 7/2009 | Bobak .................. G06Q 10/06 705/7.27 |

(Continued)

OTHER PUBLICATIONS

Gou H, Huang B, Liu W, Ren S, Li Y (2000) An agent-based approach for workflow management. In: IEEE international conference on systems, man, and cybernetics, 2000 Nashville, TN, pp. 292-297.*

(Continued)

*Primary Examiner* — Timothy Padot
(74) *Attorney, Agent, or Firm* — Finnegan, Henderson, Farabow, Garrett & Dunner, LLP

(57) ABSTRACT

This disclosure relates generally to method and system for evaluating performance of workflow resource patterns. Structured way of resource utilization for performing a complex task thereby evaluating end to end performance in any industrial warehouse is crucial. The proposed disclosure processes the received task to disintegrate into a plurality of sub tasks and for each sub task a workflow resource pattern is generated. Further, dynamically each workflow resource pattern is mapped to corresponding queueing mode of queueing station in the hybrid queueing network model. The system further evaluates end to end performance for each workflow resource pattern by computing performance metrics. Based on the performance evaluation the queuing mode may be replaced with another queueing modes for the workflow resource pattern. The proposed disclosure robustly analyses end to end performance of the workflow resource pattern maximizing throughput, improvising accuracy, increasing efficiency and thereby minimizing cost.

12 Claims, 11 Drawing Sheets

(58) Field of Classification Search
USPC .......................................................... 705/7.27
See application file for complete search history.

(56) References Cited

U.S. PATENT DOCUMENTS

| | | | |
|---|---|---|---|
| 2016/0328273 A1 | 11/2016 | Molka et al. | |
| 2018/0158016 A1* | 6/2018 | Pandya | G05B 19/41895 |
| 2018/0182054 A1* | 6/2018 | Yao | G06Q 30/0635 |
| 2018/0308022 A1* | 10/2018 | Philips | G06Q 10/0633 |
| 2019/0049975 A1* | 2/2019 | Kattepur | G06Q 10/087 |

OTHER PUBLICATIONS

Edward A. Stohr; J. Leon Zhao. Workflow Automation: Overview and Research Issues. Information Systems Frontiers; Sep. 2001; 3, 3; ABI/INFORM Global, p. 281.*

Modeling of Workflow Congestion and Optimization of Flow Routing in a Manufacturing/Warehouse Facility. Zhang, Min; Batta, Rajan; Nagi, Rakesh. Management Science55.2: 267-280. Institute for Operations Research and the Management Sciences. (Feb. 2009).*

Zhang, L. et al. (2018). "SMVA: A Stable Mean Value Analysis Algorithm for Closed Systems with Load-dependent Queues," retrieved from http://www.cas.mcmaster.ca/~downd/Chapter04.pdf. (15 pages).

Roy, D. et al. "An Integrated Network Modeling Framework for Analysis of Multi-line Order Pick Systems," *15th IMHRC Proceedings of Progress in Material Handling Research*, Savannah, Georgia, Jul. 23-26, 2018; 7 pages.

Long, F. et al. (2017). "Modelling the flexibility of production systems in Industry 4.0 for analyzing their productivity and availability with high-level Petri nets," *IFAC PapersOnLine*, vol. 50, No. 1; pp. 5680-5687.

Yin, Y. et al. (2019). "A smart performance measurement approach for collaborative design in Industry 4.0," *Advances in Mechanical Engineering*, vol. 11, No. 1; pp. 1-15.

* cited by examiner

METHOD AND SYSTEM FOR EVALUATING PERFORMANCE OF WORKFLOW RESOURCE PATTERNS

PRIORITY CLAIM

This U.S. patent application claims priority under 35 U.S.C. § 119 to: India Application No. 201921012190, filed on Mar. 28, 2019. The entire contents of the aforementioned application are incorporated herein by reference.

TECHNICAL FIELD

The disclosure herein generally relates to workflow automation, and, more particularly, to method and system for evaluating performance of workflow resource patterns.

BACKGROUND

Industrial automation is an emerging area of interest for enterprises and organizations during manufacturing and various workflow processes. In a workflow automation scenario of an industrial warehouse, autonomous robots are replaced by human participants for task completion. With the concurrency of varying demand rates for inventory and supply chain optimization, a structured approach is required to model resources for executing complex workflows and to select an optimal work flow resource pattern for task completion is critical. For accomplishing a task, a plurality of workflow resource patterns can be generated based on the demand rates and the task complexity. However, in real time the combination of workflow processes with performance modelling approach allows extension for various industrial deployments. Hence, there is a need for analyzing end to end performance metrics for task workflows.

Conventional methods and systems that identify a workflow resource pattern for the task cannot generate the resource pattern dynamically based on current availability of resources. Further, they hardly provide any performance metric to compare among the available workflow resource patterns. Thus, in such scenarios selection of the workflow resource pattern for the task completion may not always be optimal.

In an existing system, an automated technique for allocating resources in the task workflow are based on resource characteristics information and the task. However, the existing system limits in allocating workflow resources to the tasks dynamically based on resource availability. Further, the system also limits in analyzing end to end performance of the resources allocated to the task workflow based on queueing modes which is a major factor for measuring performance metrics.

SUMMARY

Embodiments of the present disclosure present technological improvements as solutions to one or more of the above-mentioned technical problems recognized by the inventors in conventional systems. For example, in one embodiment, a system for evaluating performance of workflow resource patterns is provided. The system includes receiving a request for executing a plurality of tasks. Each task from the plurality of tasks are then disintegrated into a plurality of subtasks. Further, for each sub task among the plurality of sub tasks a plurality of workflow resource pattern are generated dynamically corresponding to each sub task from the plurality of sub tasks. Here, each workflow resource pattern is associated with a set of resource agents selected from a plurality of resource agents based on the availability of the plurality of resource agents for executing the task. Further, each workflow resource pattern is mapped to a queueing mode among a plurality of queueing modes of a queueing station in a hybrid queueing network model for execution of the task. Here, mapping is based on a completion probability value and a think time, and wherein the queueing mode of the queueing station comprises a single class queueing mode, a scale out class queueing mode, a scale up class queueing mode and a hybrid scale class queueing mode. Further, for each workflow resource pattern mapped to the single class queueing mode or to the scale out class queueing mode performance is evaluated, wherein the performance is estimated by computing a response time and a queue length for each workflow resource pattern. The queuing mode mapped with the workflow resource pattern is replaced with another queuing mode of the queueing station, wherein the queueing mode are replaced dynamically based on the performance evaluated.

In another aspect, a method for evaluating performance of workflow resource patterns is provided. The method includes receiving a request for executing a plurality of tasks. Each task from the plurality of tasks are then disintegrated into a plurality of subtasks. Further, for each sub task among the plurality of sub tasks a plurality of workflow resource pattern are generated dynamically corresponding to each sub task from the plurality of sub tasks. Here, each workflow resource pattern is associated with a set of resource agents selected from a plurality of resource agents based on the availability of the plurality of resource agents for executing the task. Further, each workflow resource pattern is mapped to a queueing mode among a plurality of queueing modes of a queueing station in a hybrid queueing network model for execution of the task. Here, mapping is based on a completion probability value and a think time, and wherein the queueing mode of the queueing station comprises a single class queueing mode, a scale out class queueing mode, a scale up class queueing mode and a hybrid scale class queueing mode. Further, for each workflow resource pattern mapped to the single class queueing mode or to the scale out class queueing mode performance is evaluated, wherein the performance is estimated by computing a response time and a queue length for each workflow resource pattern. The queuing mode mapped with the workflow resource pattern is replaced with another queuing mode of the queueing station, wherein the queueing mode are replaced dynamically based on the performance evaluated.

In yet another aspect, provides one or more non-transitory machine readable information storage mediums comprising one or more instructions, which when executed by one or more hardware processors perform actions including receiving a request for executing a plurality of tasks. Each task from the plurality of tasks are then disintegrated into a plurality of subtasks. Further, for each sub task among the plurality of sub tasks a plurality of workflow resource pattern are generated dynamically corresponding to each sub task from the plurality of sub tasks. Here, each workflow resource pattern is associated with a set of resource agents selected from a plurality of resource agents based on the availability of the plurality of resource agents for executing the task. Further, each workflow resource pattern is mapped to a queueing mode among a plurality of queueing modes of a queueing station in a hybrid queueing network model for execution of the task. Here, mapping is based on a completion probability value and a think time, and wherein the queueing mode of the queueing station comprises a single class queueing mode, a scale out class queueing mode, a scale up class queueing mode and a hybrid scale class queueing mode. Further, for each workflow resource pattern mapped to the single class queueing mode or to the scale out class queueing mode performance is evaluated, wherein the performance is estimated by computing a response time and a queue length for each workflow resource pattern. The queuing mode mapped with the workflow resource pattern is replaced with another queuing mode of the queueing station, wherein the queueing mode are replaced dynamically based on the performance evaluated.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
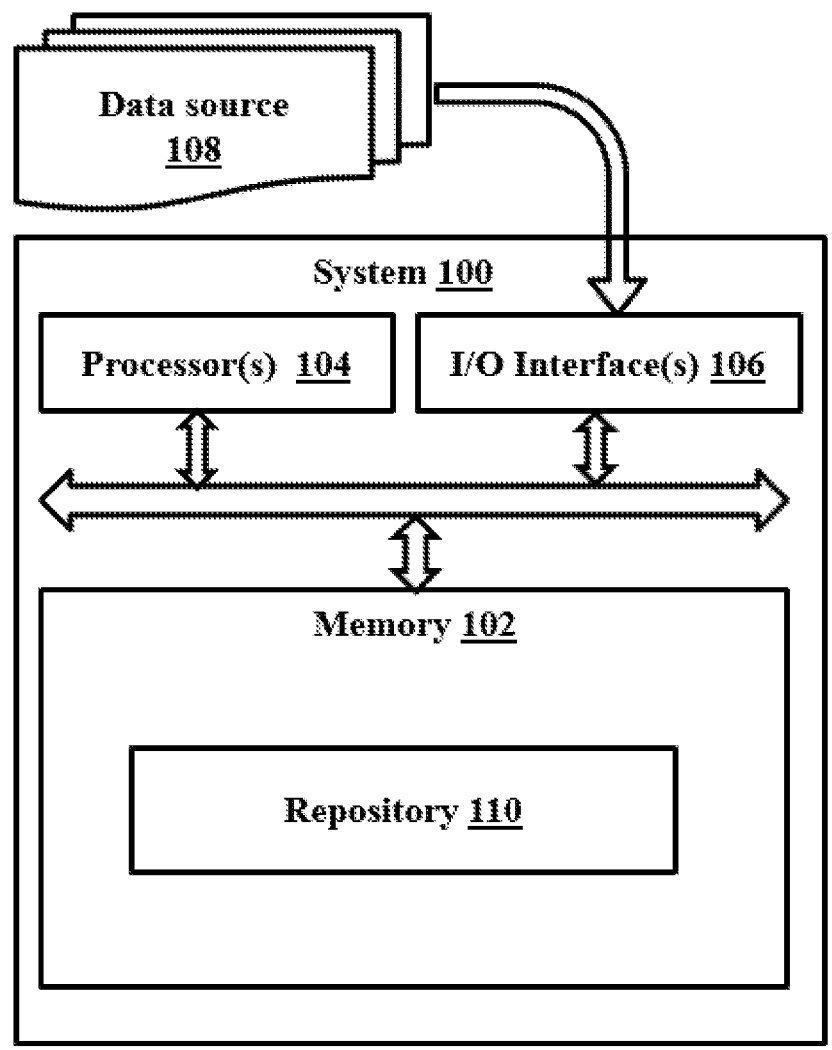
FIG. 1 illustrates an exemplary block diagram of a system for evaluating performance of workflow resource patterns, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments of the present disclosure herein provides a method and system for evaluating performance of workflow resource patterns. The workflow resource patterns are generated from the task for assigning resource agents for performing the task in an industrial warehouse. The workflow resource pattern may include a task creation, a task assignment and/or a task execution of workflows. The proposed method and the system, enables a structured way of analyzing end to end performance of workflow resource pattern for complex tasks. This method overcomes issues of accuracy and efficiency associated with unstructured data and processes. The system outperforms performance when automation entails parallel processing, superior service demands or delegation of workload. The system can be deployed in any industrial warehouse where complex workflow tasks are involved. This provides accurate characterization of automated workflow resource patterns for higher concurrency loads with multiple classes load dependent service demands.

Referring now to the drawings, and more particularly to FIG. 1 through FIG. 8, where similar reference characters denote corresponding features consistently throughout the figures, there are shown preferred embodiments and these embodiments are described in the context of the following exemplary system and/or method.

FIG. 1 illustrates an exemplary block diagram of a system for evaluating performance of workflow resource patterns, in accordance with some embodiments of the present disclosure. In an embodiment, the system 100 includes processor (s) 104, communication interface device(s), alternatively referred as or input/output (I/O) interface(s) 106, and one or more data storage devices or memory 102 operatively coupled to the processor (s) 104. The processor (s), alternatively referred as one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server. The I/O interface 106, through the ports is configured to receive tasks from data source 108.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102, may include a repository 110. The repository 110 may store the workflow resource patterns generated from the task. The repository 110 may also record the plurality of attributes for the workflow resource pattern mapping to the corresponding queuing modes. The memory 102 may further comprise information pertaining to input(s)/output(s) of each step performed by the system 100 and methods of the present disclosure.

Figure 2:
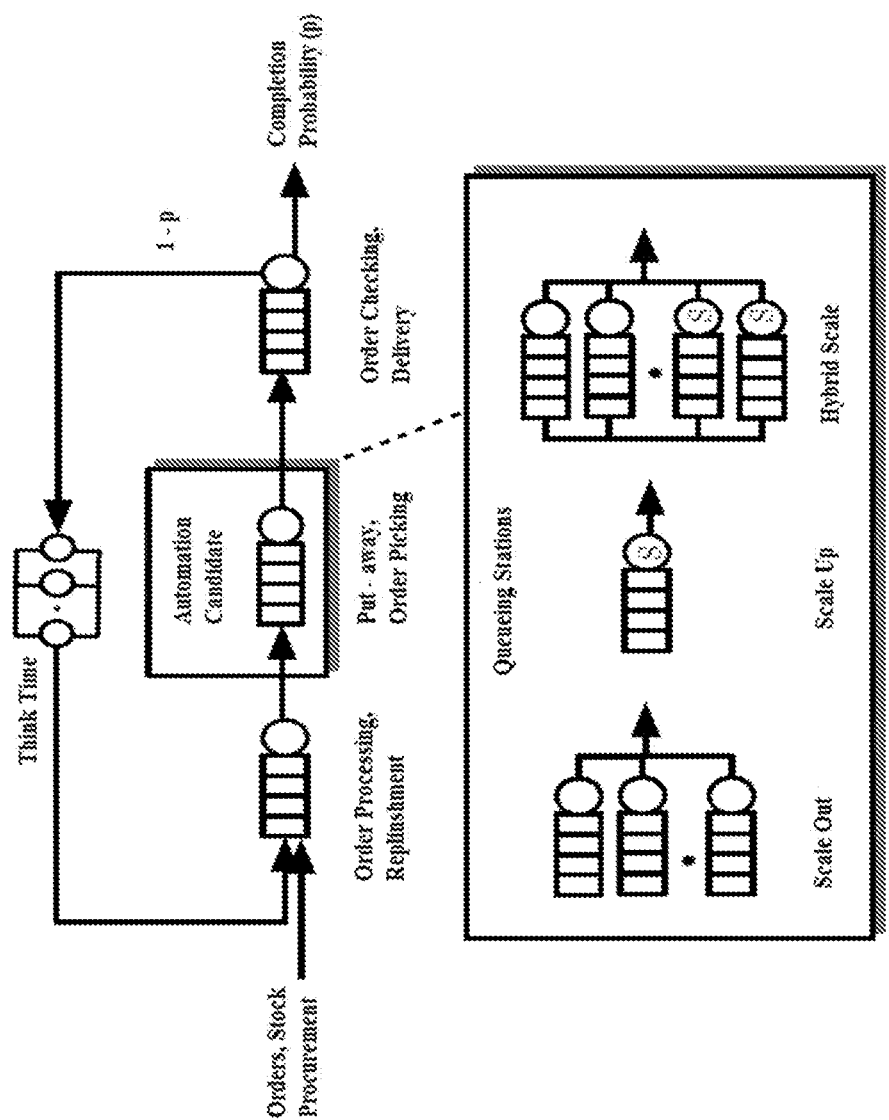
FIG. 2 is an example architecture of the system of FIG. 1 utilizing a hybrid network model implemented for evaluating performance of workflow resource patterns by executing a task in an industrial warehouse, in accordance with some embodiments of the present disclosure.
Figure 3:
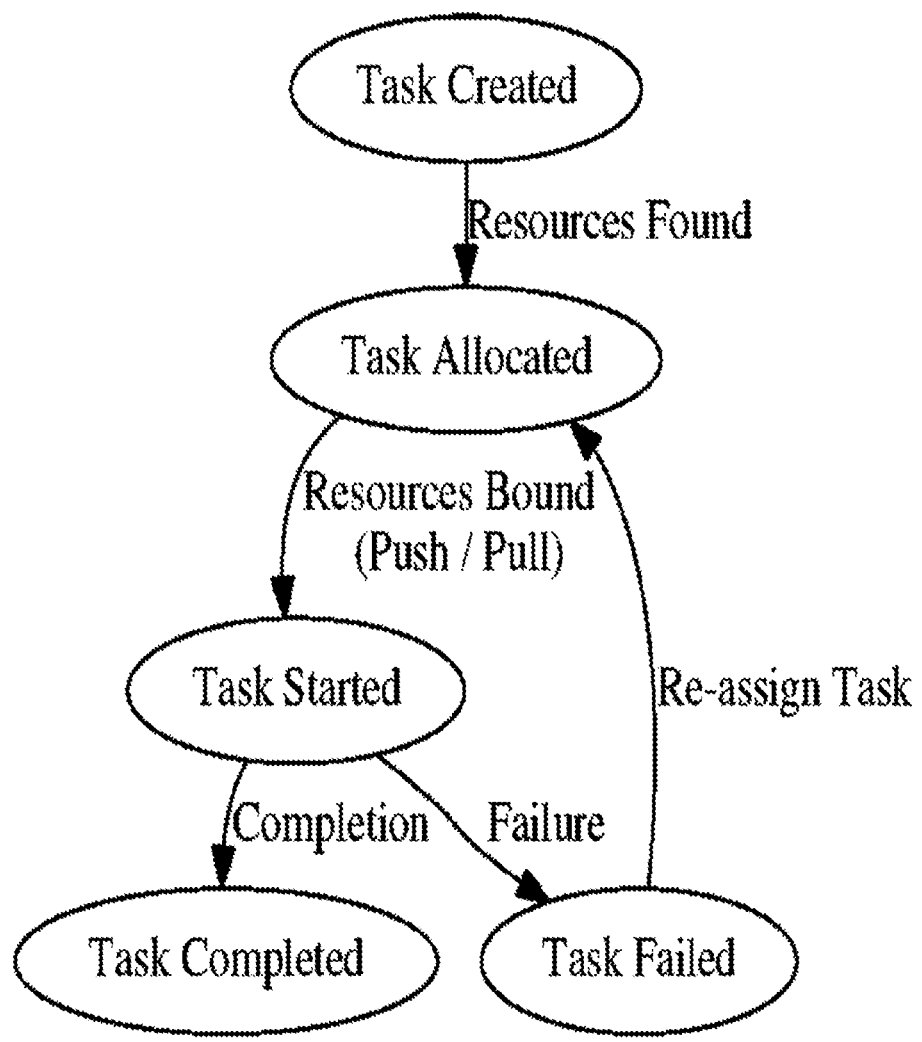
FIG. 3 illustrates an example workflow resource pattern depicting various activities of a task modelled in the industrial warehouse, in accordance with some embodiments of the present disclosure.
Figure 4:
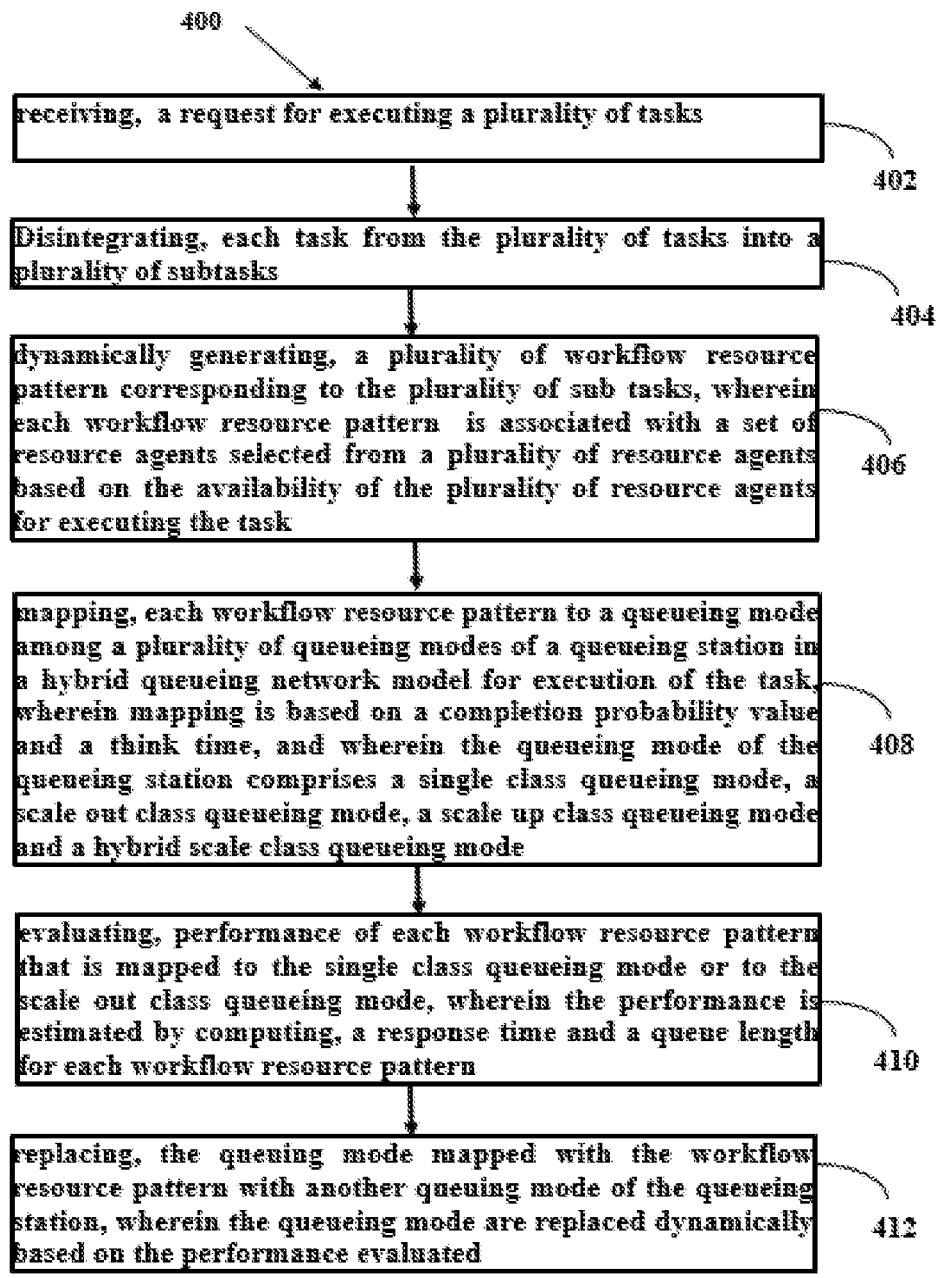
FIG. 4 is a flow diagram illustrating the method for evaluating the performance of workflow resource patterns of the task in the industrial warehouse, in accordance with some embodiments of the present disclosure.

FIG. 4 is a flow diagram illustrating the method 400 for evaluating the performance of workflow resource patterns of the task in the industrial warehouse, in accordance with some embodiments of the present disclosure. The steps of the method 400 of the flow diagram will now be explained with reference to the components or blocks of the system 100 in conjunction with the example architecture of the system as depicted in FIG. 2 and the example workflow resource pattern as depicted in FIG. 3. In an embodiment, the system 100 comprises one or more data storage devices or the memory 102 operatively coupled to the one or more processors 104 and is configured to store instructions for execution of steps of the method 400 by the one or more processors 104. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Referring to the steps of the method 400, for evaluating performance of workflow resource patterns, in an embodiment of the present disclosure, at step 402 of the method 400, the processor (s) 104 is configured to receive a request for executing a plurality of tasks. The plurality of tasks are received by the hybrid network model and for which a plurality of workflow resource patterns are generated. Once the task is created it may be allocated to a plurality of resource agents. The plurality of resource agents comprises a robotic agent and a human agent or combination of both. For the created task more than one resource agents may be allocated and the allocated task could be a push or it a bid pull based on the availability of resource agents among the plurality of resource agents. The tasks that are incomplete may be re allocated to other resource agents that are available from the plurality of resource agents. Considering FIG. 2 as an example depicting the task which may be of locating and picking a carton of cookies from the industrial warehouse which are explained in conjunction with the further sections of the proposed disclosure.

Referring back to the steps of method 400, at step 404, in an embodiment of the present disclosure, the processor (s) 104 is configured to disintegrate each task from the plurality of tasks into a plurality of subtasks. The task allocated to at least one of the resource agent among the plurality of resource agents are disintegrated into the plurality of sub tasks to complete the goal using a knowledge base. The knowledge base coordinates the appropriate actions in relation to an individual robotic agent's perception. The knowledge base includes description of domain ontology, task templates, algorithmic implementations and resource descriptions stored in the repository 110 of the memory 102. The below mentioned algorithm 1 represents an overview of an robotic agents perception and actions through knowledge base, ---
Algorithm 1: Stateful Intelligent Robotic Agent.

Input: Robot Perception; Knowledge Base; Robot State;
Output: Robot Action;
Robot State ← Interpret(Perception);
Knowledge Base ← Update(Knowledge Base, Perception);
Action ← Choose-Best-Action(Knowledge Base);
Robot State ← Update(State, Action);
Knowledge Base ← Update(Knowledge Base, Action);

---

Considering an example of an agent's (robot) action as depicted in FIG. 2 for an instance with an order picking robotic agent in the industry warehouse as mentioned above in step 402 for the robotic components in the industrial warehouse utilizes the following processes such as goals, perception, actions and object attributes. The goals process depicts understanding goals of each task and the plurality of subtasks, such as placing correct parts into correct bins within the given time constraints. The perception depicts identification of objects and detecting obstacles using camera and odometry sensors that senses the environment. This aids the robotic agent in detecting objects and identification. Further, the location of robotic agents view and environment may also be perceived. The actions process depicts identifying granular actionable for the plurality of subtasks, such as moving to particular location, picking up parts of orders or sorting objects. Constraints may be placed on the robot capabilities, motion plans and accuracy in performing such actions. The object attributes process depicts utilization of domain models for goal completion such as the warehouse environment maps, rack type and product features.

Referring to the steps, at step 406, in an embodiment of the present disclosure, the processors (s) 104 is configured to generate dynamically a plurality of workflow resource pattern corresponding to the plurality of sub tasks. Each workflow resource pattern is associated with a set of resource agents selected from a plurality of resource agents based on the availability of the plurality of resource agents for executing the task. The workflow resource pattern is an exhaustive list of pattern in task allocation in an industrial warehouse. The workflow resource patterns are used for allocating resource agents for the tasks such as task creation, task allocation, monitoring and completion involving multiple modular components as observed in workflow execution dynamically.

Referring to the steps, at step 408, in an embodiment of the present disclosure, the processors (s) 104 is configured to map each workflow resource pattern dynamically to a queueing mode from a plurality of queueing modes of a queueing station in the hybrid queueing network model, as depicted by the example hybrid queueing model in FIG. 2. Here, each workflow resource pattern is mapped to the corresponding queueing mode of the queueing station utilizing a completion probability value (p) and a think time (Z). Accordingly, as described with references to FIG. 2 and FIG. 3, the example task performed in the industrial warehouse of the queueing network models are utilized for modeling manufacturing, enterprise and software performance. The completion probability value (p) is tuned depending on the domain and the type of products in the industrial warehouse deployments. The lower value of completion probability value (p) depicts a closed queueing hybrid network model for instances when orders and procurements are processed as batches. The higher value of completion probability value (p) depicts an open queueing hybrid network model for instances with first in first out transactional orders. The think time (Z) specifies idle time spent by the plurality of resource agents into the hybrid queueing network model. Further, the plurality of queueing modes comprise a single class queueing mode, a scale out class queueing mode, a scale up class queueing mode and a hybrid scale class queueing mode. The single class queueing mode M/G/1 may also be known as default mode or single class queuing mode for order processing and replenishment activities reducing inventory (−n products) and procurement/replenishment increasing inventory (+m products). The scale out class queueing mode involves parallelizing tasks to multiple resources. For instance if one of the resource agent is handling the task, the mode may add more of similar resource agents to meet increasing demand. The scale up class queuing mode involves replacing a hybrid queueing mode with a superior one such as the robotic resource agent as picking agent with higher individual throughput. Further, the hybrid scale out mode approach parallelizes tasks and replaces a few of the resource agents among the plurality of resource agents with superior ones. Each of the queueing mode of the queueing station are utilized for performance and operational analysis of the automation workflow resources. The below mentioned table 1 provides mapping of workflow resource pattern to the corresponding each queueing class mode. Each of the workflow resource pattern may be generated for the created task for identifying resource agents. The table 1 represents mapping of the generated workflow resource patterns mapped to the single class queuing mode, scale up class queueing mode, scale out class queueing mode and hybrid class queuing mode. The single class queueing mode (M/G/1) and for the subtasks as (i) creation or task allocation, the workflow resource patterns may be 1. Direct allocation, 11. Automatic execution, 40. Configurable unallocated work item visibility and 41. Configurable allocated work item visibility. (ii) push patterns and pull patterns, the workflow resource patterns may be nil. (iii) task execution or detour patterns, the workflow resource patterns may be 32. Suspension-resumption, 33. Skip, 36. Commencement on creation, 38. Piled execution and 39. Chained execution.

TABLE 1

| Automation/ Hybrid Queuing Modes | Task Creation, Task Allocation Patterns | Push Patterns | Pull Patterns | Task Execution, Detour Patterns |
|---|---|---|---|---|
| Single (M/G/1) | 1. Direct Allocation 11. Automatic Execution 40. Configurable Unallocated Work Item Visibility 41. Configurable Allocated Work Item Visibility | | | 32. Suspension— Resumption 33. Skip 36. Commencement on Creation 38. Piled Execution 39. Chained Execution |
| Scale out | 5. Separation of Duties 6. Case Handling | 13. Distribution by Offer— Multiple Resources 16. Round Robin Allocation 18. Early Distribution 19. Distribution on Enablement 20. Late Distribution | 24. System- Determined Work Queue Content | 29. Deallocation 30. Stateful Reallocation 31. Stateless Reallocation 37. Commencement on Allocation 42. Simultaneous Execution 43. Additional Resources |
| Scale up | 3. Deferred Allocation 7. Retain Familiar 8. Capability- based Allocation 9. History-based Allocation 10. Organizational Allocation | 12. Distribution by Offer— Single Resource 14. Distribution by Allocation— Single Resource | 21. Resource- Initiated Allocation 22. Resource- Initiated Execution— Allocated Work Item 23. | 27. Delegation 28. Escalation 34. Redo 35. Pre-Do |

TABLE 1-continued

| Automation/ Hybrid Queuing Modes | Task Creation, Task Allocation Patterns | Push Patterns | Pull Patterns | Task Execution, Detour Patterns |
|---|---|---|---|---|
| | | 15. Random Allocation | Resource-Initiated Execution—Offered Work Item | |
| Hybrid scale | 2. Role-Based Allocation 4. Authorization | 17. Shortest Queue | 25. Resource-Determined Work Queue Content 26. Selection Autonomy | 42. Simultaneous Execution 43. Additional Resources | such mapping allows to analyze the performance of complex workflows, using the abstraction of hybrid queueing network model.

At step 410, in an embodiment of the present disclosure, the processors (s) 104 is configured to evaluate the performance of each workflow resource pattern dynamically that is mapped to the single class queueing mode or to the scale out class queueing mode. The performance is estimated by computing a response time and a queue length for each workflow resource pattern. In an embodiment, the performance analysis of the hybrid queueing network model is specified with the notations as mentioned in table 2 using performance metrics. The performance metrics includes analysis of a throughput, service demand and concurrency for the workflow resource pattern.

TABLE 2

| Symbol | Notation |
|---|---|
| Qi | Number of jobs in queuing mode i |
| Ui | Throughput of queuing mode i |
| Xi | Utilization of queuing mode i |
| Ri | Response time of queuing mode i |
| Vi | Average number of visits to queuing mode i |
| Si | Service demand of queuing mode i |
| X | Throughput of the system |
| N | Average number of tasks in the queuing system |
| R | Average response time of the queuing system |
| Z | Mean think time of a task |

The plurality of resource agents receives the task to be executed in the industrial warehouse. To execute the tasks utilization law, service demand law and littles law are applied on the task. The laws used are known in the art. The utilization law is the fraction of time the resource agent is busy and devices with high utilization cause bottlenecks as described below in equation 1, $$U_i = X_i \ldots S_i \quad (1)$$

The service demand law is the total average service time spent at resources i, denoted $S_i$ as mentioned below in equation 2, $$S_i = \frac{U_i}{X} \quad (2)$$

The littles law states the number of concurrent users or orders in the system with the throughput and the response time. If there are N orders in the system, each with think time Z (time waiting between interactions with the system) and the system processes at the throughput rate X producing a wait time R, the following relationship applies as mentioned below un equation 3, $$N = X \cdot (R + Z) \quad (3)$$

Further, utilizing these laws on each workflow resource pattern with an additional enhancement is mentioned below for varying service demands. The hybrid network model considers lower completion probability value depicting closed hybrid queueing network model. Initially, the hybrid network queueing model is started with the empty network and then increases the number of customers by 1 at each iteration until there are required number (N) of customers in the system. For each queueing mode k=1, 2, . . . K in the queueing station of the hybrid network model, the waiting time $R_k$ is computed using the static input service demands $S_k$ and the number of jobs in the queue length $Q_k$ as mentioned below in equation 4, $$R_k = S_k \cdot (1 + Q_k) \quad (4)$$

The system throughput is then computed using the sum of waiting times at each node and Little's law (eq. 3). Finally, Little's law is applied to each queue to compute the updated mean queue lengths for k=1, 2, . . . K.

In an embodiment, for analyzing the performance of each workflow resource pattern mapped to the single class queueing mode, the response time and the queue length is computed. For computation, the system obtains, a plurality of attributes for each workflow resource pattern, wherein the plurality of attributes comprises a set of queuing stations, a corresponding service demand, a visit count, the think time, a number of concurrent users and the completion probability value. Here, mapping relates to a single category of products handled by industry 4.0 warehouses. For two models, load independent case and load dependent case response time is computed as mentioned below in equation 5, $$R_k = \begin{cases} S_k \cdot (1 + Q_k), & \text{LoadIndependentCase} \\ S_k \cdot f(U_k^n) \cdot (1 + Q_k), & \text{LoadDependentCase} \end{cases} \quad (5)$$

This technique can be elaborated by incorporating step by step process as algorithm 2, for each workflow resource pattern mapped to the single class queueing model of the queueing station of the hybrid queueing network model for constant or load dependent service demand as depicted below,

---

Algorithm 2 - Single class queueing model, constant/load dependent service demand

---

Input: Set of queuing stations k ∈ K; Corresponding Service demands $S_k$ and Visit counts $V_k$ Number of concurrent users N; Think time Z; Completion Probability of task completion p.
Output: Throughput $X^n$ with increasing concurrency n ∈ N, Response time $R^n$ with increasing concurrency n ∈ N;
At step 1, for k ← 1 to K do
At step 2, Initialize queue at each station: $Q_k$ ← 0
At step 3, Initialize utilization at each station: $U_k$ ← 0
At step 4, for n ← 1 to N do
At step 5, for k ← 1 to K do
At step 6, Response time at each station:

$$R_k = \begin{cases} S_k \cdot (1 + Q_k), & LoadIndependentCase \\ S_k \cdot f(U_k^n) \cdot (1 + Q_k), & LoadDependentCase \end{cases}$$

At step 7, Total response times using visit counts: $R^n = \Sigma_{k=1}^{K} V_k \cdot R_k$ At step 8, Throughput with Little's Law: $X^n = \dfrac{n}{R^n + Z}$ At step 9, for k ← 1 to K do
At step 10, Update queues at each station:
$Q_k = (1 - p) \cdot X^n \cdot V_k \cdot R_k$ At step 11, Update utilization at each station: $U_k^n = \dfrac{Q_k}{1 + Q_k}$ At step 12, return $X^n$, $R^n$, $U_k^n$

---

The response time is the product of the constant service demand and the queue length. Where, the load independent case has constant service demand $S_k$, while the load dependent case has service demands that vary as a function of utilization at each concurrent load level $S_k \cdot f(U_k^n)$. Load dependent service demands are particularly realistic when human agents from the plurality of resource agents are involved, with superior service times seen with greater demand loads. The above mentioned algorithm 1 has the completion probability (p), which is used to append queue lengths during each iteration for computing queue length as mentioned below in equation 6, $$Q_k = (1-p) \cdot X^n \cdot V_k \cdot R_k \qquad (6)$$

The queue length is the product of completion probability value, the throughput, the response time and the visit counts. This allows to simulate both closed queueing model with lower completion probability p and partially open for higher completion probability p hybrid queueing models.

In an embodiment, for each workflow resource pattern mapped to the scale out class queueing mode, the response time and the queue length is computed. To compute the response time and queue length, scale out class queueing model utilizes 'c' classes of orders. This is very crucial when there are multiple types of orders having different rates and guarantee makes use of shared resources. This technique can be elaborated by incorporating step by step process as algorithm 3, for each workflow resource pattern mapped to the single class queueing model of the queueing station of the hybrid queuing network model for constant or load dependent service demand as depicted below,

---

Algorithm 3 - Scale out class queueing model, constant/load dependent service demand

---

Input: Set of queuing stations k ∈ K; Corresponding Service demands $S_k$ and Visit counts $V_k$ Number of concurrent users N; Think time Z; Number of Classes C with population of each class $n_1, n_2, \ldots, n_C$ Probability of task completion p.
Output: Throughput $X^n$ with increasing concurrency n ∈ N, Response time $R^n$ with increasing concurrency n ∈ N;
At step 1, for k ← 1 to K do
At step 2, Initialize queue at each station: $Q_k$ ← 0
At step 3, Initialize utilization at each station: $U_k$ ← 0
At step 4, for n ← 1 to $\Sigma_{c=0}^{C} N_c$ do
At step 5, for c ← 1 to C do
At step 6, for k ← 1 to K do
At step 7, Response time at each station:

$$R_{c,k} = \begin{cases} S_k \cdot (1 + Q_k), & LoadIndependentCase \\ S_k \cdot f(U_k^n) \cdot (1 + Q_k), & LoadDependentCase \end{cases}$$

At step 8, for c ← 1 to C do
At step 9, Total response times using visit counts:
$R_c^n = \Sigma_{k=1}^{K} V_{c,k} \cdot R_{c,k}$ At step 10, Throughput with Little's Law: $X_c^n = \dfrac{n_c}{R_c^n + Z_c}$ At step 11, for k ← 1 to K do
At step 12, Update queues at each station:
$Q_k = (1 - p) \cdot \Sigma_{k=1}^{K} V_{c,k} \cdot R_{c,k}$ At step 13, Update utilization at each station: $U_k^n = \dfrac{Q_k}{1 + Q_k}$ At step 14, return $X_c^n$, $R_c^n$, $U_k^n$

---

The queue length at each queueing mode of the queueing station is a combination of all the flows that are served as mentioned below in the equation 7, $$Q_k = (1-p) \cdot \Sigma_{c=1}^{C} X_c^n \cdot V_{c,k} \cdot R_{c,k} \qquad (7)$$

The performance analysis can be elaborated in detail conjunction with FIG. 6a-6D.

At step 412, in an embodiment of the present disclosure, the processors (s) 104 is configured to replace, the queuing mode mapped with the workflow resource pattern with another queuing mode of the queueing station. The queueing modes are replaced dynamically based on the performance evaluated. This allows the process to be modified dynamically according to the demand level. For instance, if the concurrent users in the system increases over a certain level, the scale up queuing mode of resources may be beneficial. For further increase, the hybrid scale queuing mode may provide improved performance.

Figure 5:
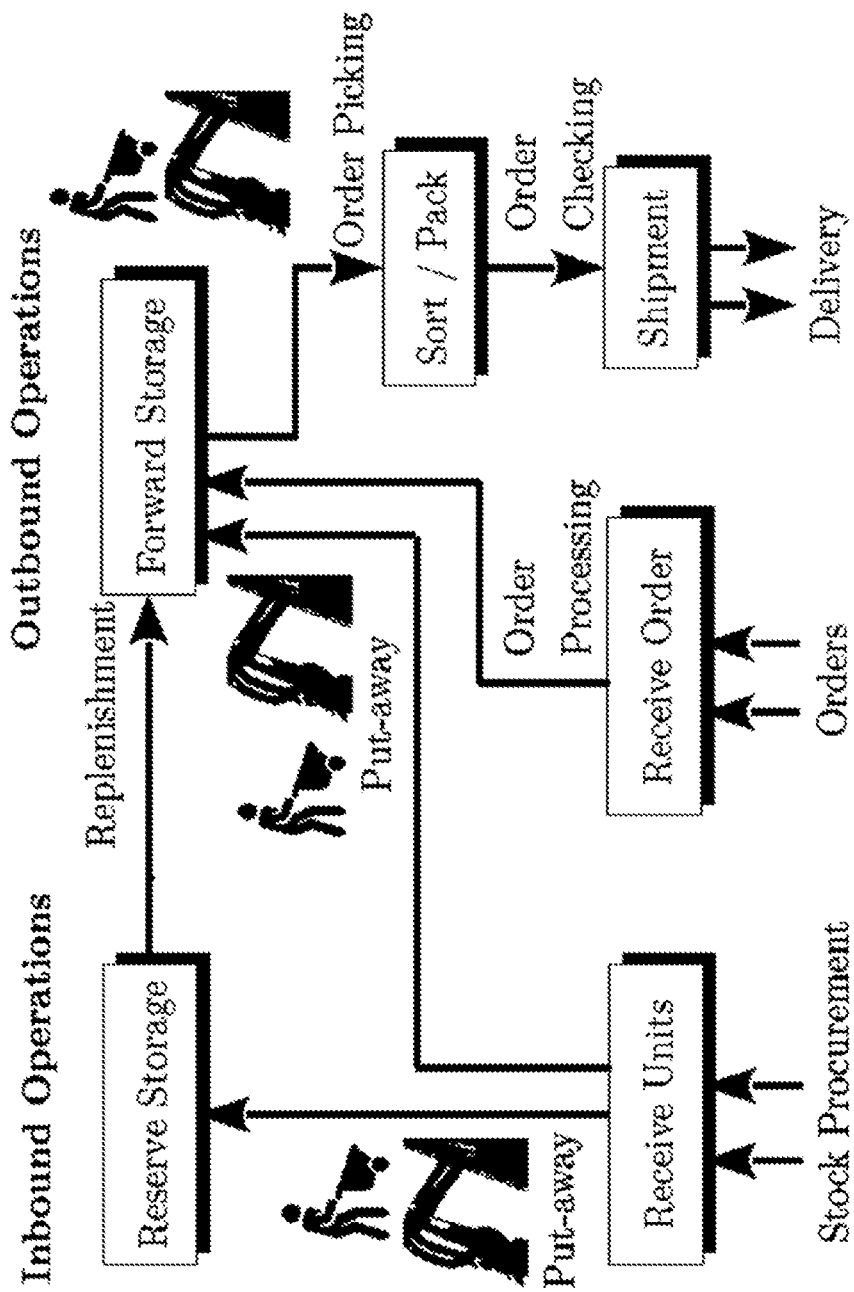
FIG. 5 is an example workflow process modelled with various activities performed in the industrial warehouse, in accordance with some embodiments of the present disclosure.

FIG. 5 is an example workflow process modelled with various activities performed in the industrial warehouse, in accordance with some embodiments of the present disclosure. Multi-party, multi supplier warehouses have been used in the retail and manufacturing industries as buffers for varying demands. The proposed method may further serve ancillary activities such as packaging, labelling and localized distribution. Stock procurement deliveries are periodically received that may be put-away in forward or reserve locations. This stock is then consumed by orders that are periodically received. In such scenarios, use of IoT and automation systems may also be scaled up, depending on performance deterioration in certain cases. In any industrial warehouse, operational process are divided into inbound operations and outbound operations. The inbound operations includes stock procurement as receiving units and then put away which is a reserve storage. The outbound operations includes orders received as receiving the order and processing the order for replenishment as forward storage. Further, the orders are picked as sort/pack process and the orders are checked for order checking to shipment for delivery process.

Figure 6A:
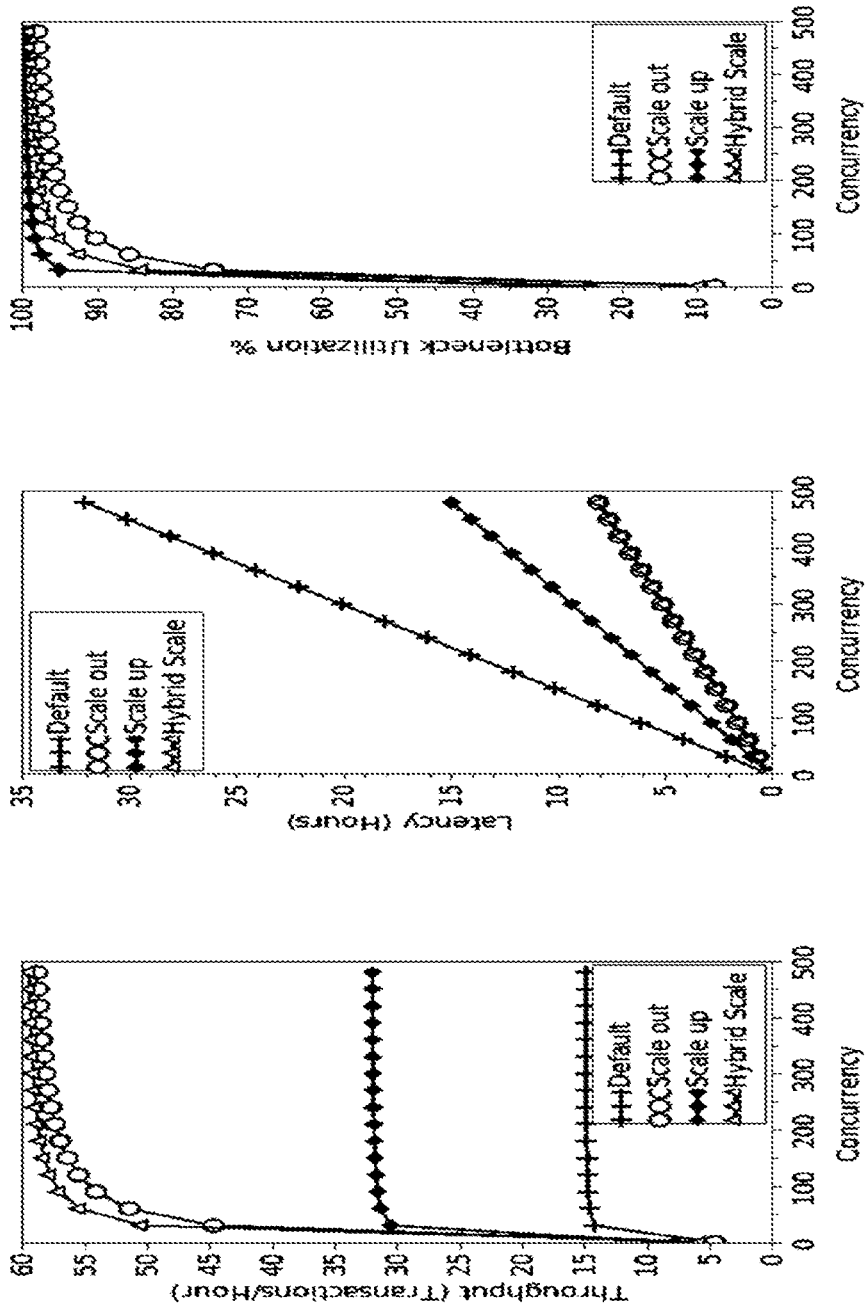
FIGS. 6*a* and 6*b* shows the performance of each workflow resource pattern mapped to a single class queueing mode of a closed hybrid queueing network model with varying completion probabilities for load independent service demands in the industrial warehouse, in accordance with some embodiments of the present disclosure.
Figure 6B:
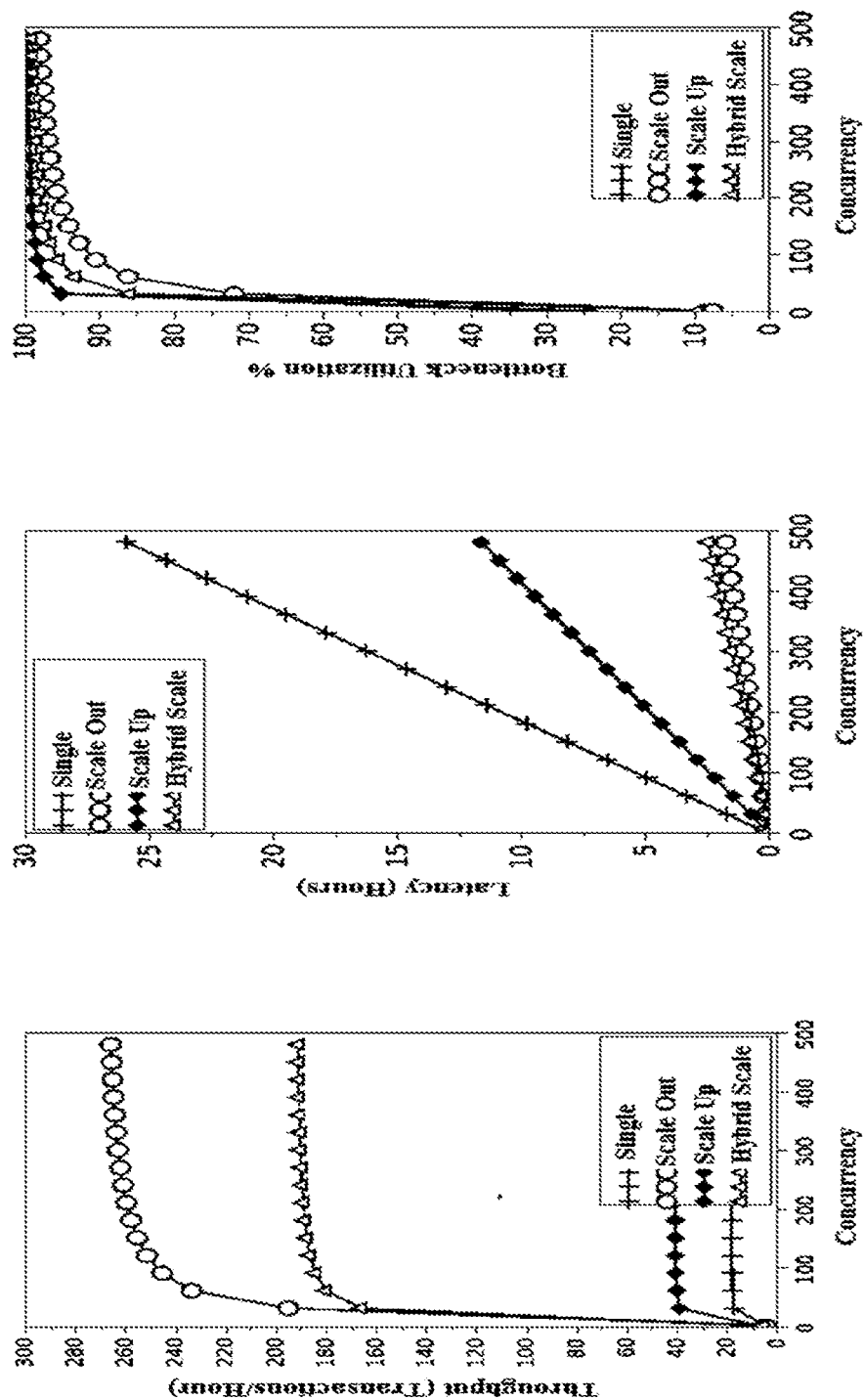

FIGS. 6a and 6b show the performance of each workflow resource pattern mapped to a single class queueing mode of a closed hybrid queueing network model with varying completion probabilities for load independent service demands in the industrial warehouse, in accordance with some embodiments of the present disclosure. The performance improvements provides realistic datasets obtained for the workflow resource pattern of the industrial warehouse automation. The experimental data are obtained as timeframes from a logistic operations of the industrial warehouse for time utilized in travel (55%), Item Search (15%), Item Extraction (10%) and Additional Overheads (20%). Applying the experimental results provides 35 seconds as the mean time for a picking robot search and extract feature, the mean time for the end-to-end automated pickup process is set at 140 seconds. This is an improvement over the mean time of 300 seconds taken by human agents among the plurality of resource agents for warehouse procurement. Using these settings, the hybrid queuing network model (refer FIG. 2) with various queuing stations. These settings are used to analyze performance characteristics under various deployment environments. Table 3 as described below provides the service demands that are used for analysis with the single class queueing mode for Order picking/put away times being set at 300 seconds.

up/hybrid scale patterns can handle greater than 200 concurrent users. The set-up is modified to a setting with p=0.8 in FIG. 6b, representing a first-in first-out transactional process. The throughput and concurrency levels supported in single class, load dependent service demands.

Figure 6C:
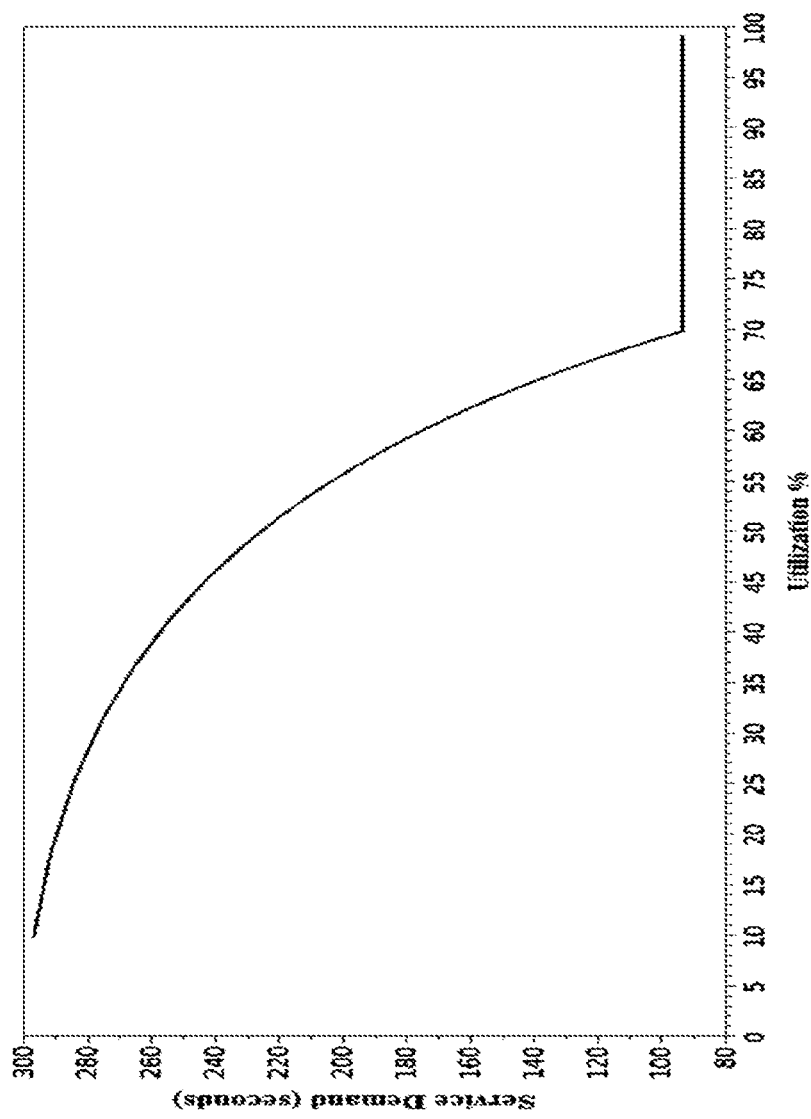
FIG. 6*c* shows the performance of each workflow resource pattern mapped to the single class queueing mode of the queueing station for load dependent service demands in the industrial warehouse, in accordance with some embodiments of the present disclosure.

FIG. 6c shows the performance of each workflow resource pattern mapped to the single class queueing mode of the queueing station for load dependent service demands in the industrial warehouse, in accordance with some embodiments of the present disclosure. The function of service are modelled with the 300 seconds service demands tapering to 100 seconds, with higher concurrent workloads. Further, for the sustained production at lower service demands may not be feasible with human agents, due to increased stress/fatigue levels. Robotic resource be able to handle the variations in service demands for prolonged periods.

Figure 6D:
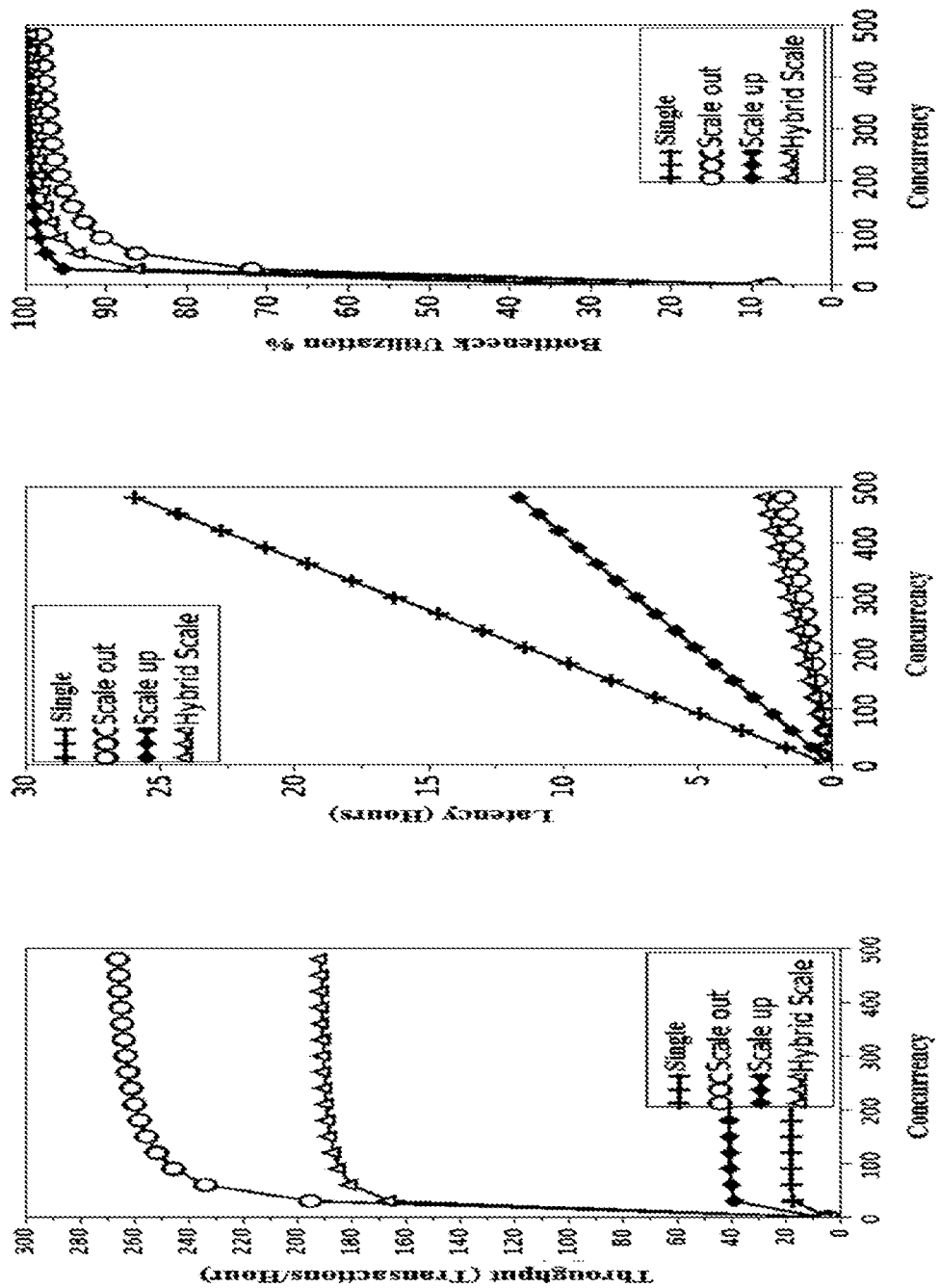
FIG. 6*d* shows the performance of each workflow resource pattern mapped to the single class queueing of the queueing station for load independent service demands in the industrial warehouse, in accordance with some embodiments of the present disclosure.

FIG. 6d shows the performance of each workflow resource pattern mapped to the single class queueing of the queueing station for load independent service demands in the industrial warehouse, in accordance with some embodiments of the present disclosure. The workflow resource pattern among the plurality of workflow resource pattern mapped to the single class queueing mode in comparison with available queueing modes in the queueing station for load independent service demands in the industrial warehouse, in accordance with some embodiments of the present disclosure. The performance improvements with various resource patterns with the scale out pattern providing the

TABLE 3

|  | Single Class mode | Scale out class mode | Scale up mode | Hybrid Scale mode |
| --- | --- | --- | --- | --- |
| Order Processing/ Replenishment | 60 Sec | 60 Sec | 60 Sec | 60 Sec |
| Put away/ Order picking | 300 Sec | 75 Sec. (4 agents) | 140 sec. | 150 sec. (2 agents), 70 sec. (2 agents) |
| Order checking/ Fulfillment | 60 Sec | 60 Sec | 60 Sec | 60 Sec |
| Think time | 60 Sec | 60 Sec | 60 Sec | 60 Sec |

Table 3 sets the Scale Up service demand value to 140 seconds (representing automated pickers), Scale Out with four (human) agents to 75 seconds and the Hybrid Scale to a combination of humans and robotic entities. The settings are obtained from algorithm 2 and algorithm 3 of the various scenarios that are typically seen in industrial warehouse automation deployments. In an embodiment for Single Class, Load Independent Service Demands algorithm 2 is simulated for a single class of items, with load independent service demands. The FIG. 6a depicts the throughput, response time and bottleneck utilization for this network. The completion probability value, p=0.2, which represents a closed queuing model (orders primarily processed in batches). The observed throughput with a human agent operating order put-away/picking is 15 transactions/hour, this doubles with the scale up class queueing mode pattern replacing with a robotic resource agent. The proposed method provides improvements are seen four concurrent operators (scale-out), providing peak throughput of 58 transactions/hour. While the single class queueing mode configuration can support around 100 concurrent users, the scale highest improvements. There are considerable deviations in the performance measures seen in FIGS. 6a and 6b. So, dependent on the deployment scenario, it will be crucial to select the best pattern for optimal performance improvement.

Figure 7:
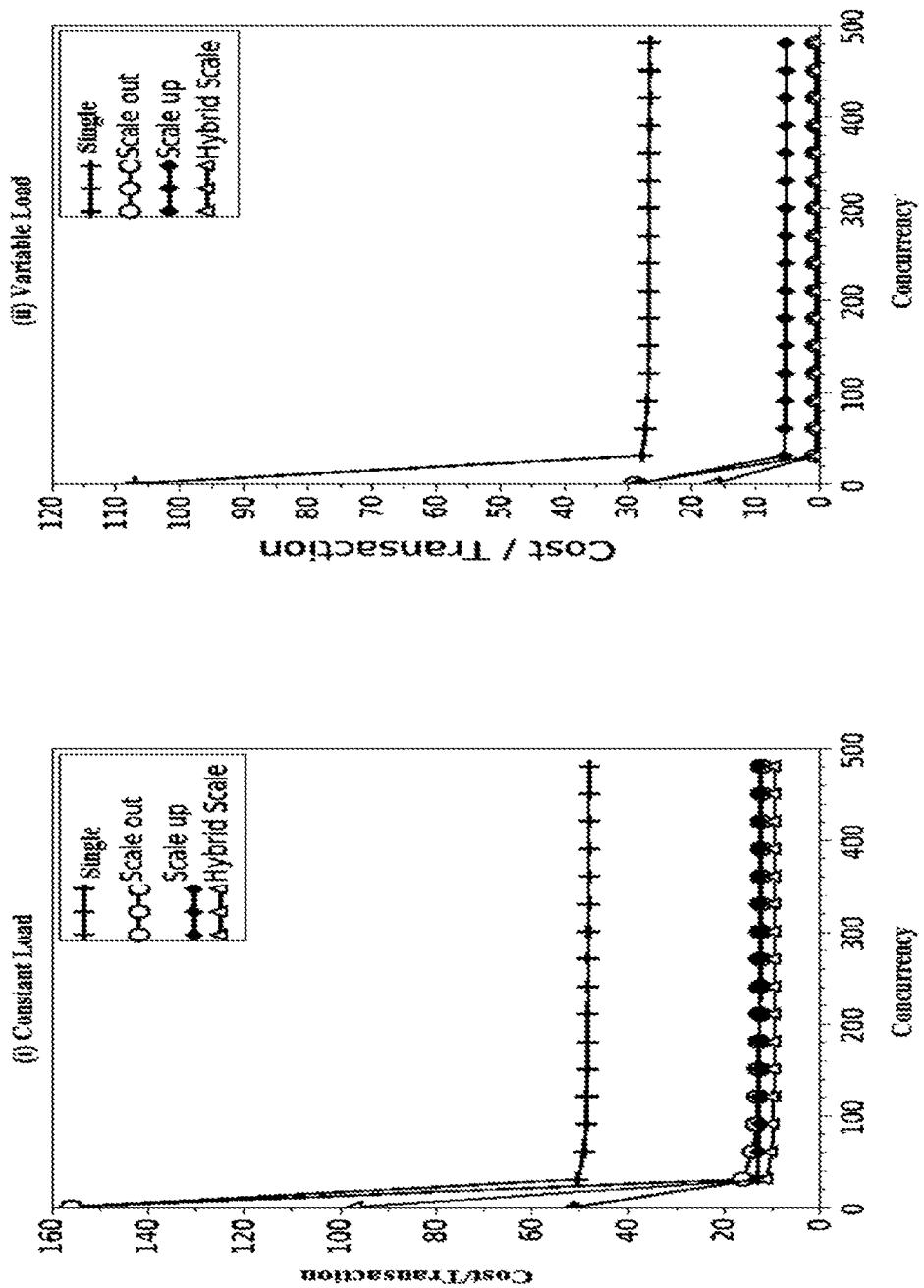
FIG. 7 shows the performance of each workflow resource pattern for cost per transactions of load dependent and independent service demands for varying constant load and variable load, in accordance with some embodiments of the present disclosure.

FIG. 7 shows the performance of each workflow resource pattern for cost per transactions for load dependent and independent service demands for constant load and variable load, in the industrial warehouse, in accordance with some embodiments of the present disclosure. Comparing the cost per transaction in as described in the figure (cost being inversely proportional to service demands), the variable service demands outperform the traditional constant demand performance. This proposes that load dependent service demand governors may be more advantages in the case of autonomous robotic agents.

Figure 8:
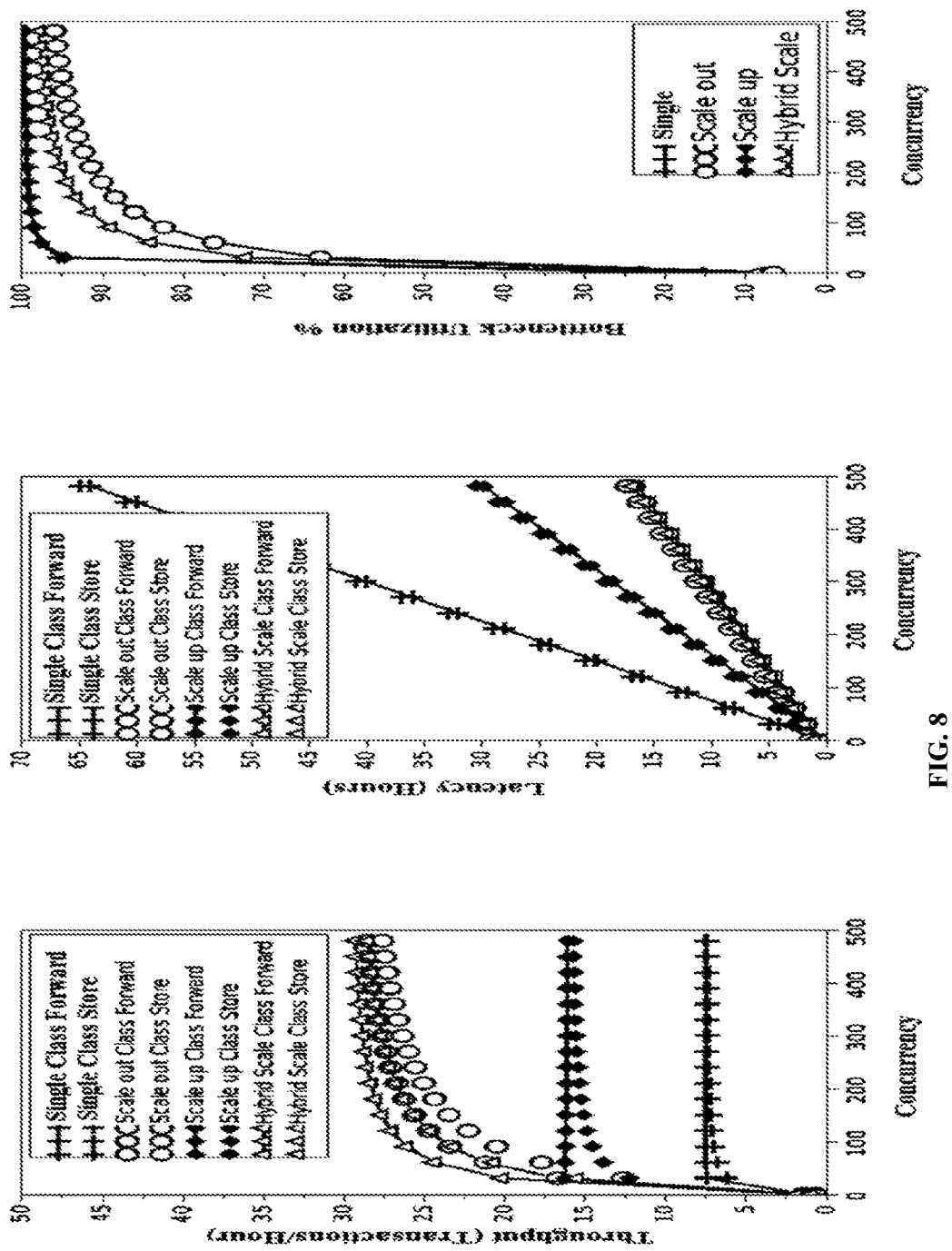
FIG. 8 shows the performance of each workflow resource pattern mapped to the scale out class queueing mode in the queueing station for load independent service demands, in accordance with some embodiments of the present disclosure.

FIG. 8 shows the performance of each workflow resource pattern mapped to the scale out class queueing mode in comparison with available queueing modes in the queueing station for load independent service demands in the industrial warehouse, in accordance with some embodiments of the present disclosure. In an embodiment for scale out class queueing mode load independent service demands, various multiple order "types" are processed by the warehouse stations. The forward orders (processed immediately) and storage orders (processed in a delayed manner) referring to FIG. 5. The mean service demands for storage orders are set to double the values reported in Table 3. In such scale out class queuing mode, there are improvements provided by scale out and hybrid scale patterns. There may be delays in think times that may be integrated into these models, this demonstrates that multi-class orders and suppliers in this framework. Due to scale out interactions, the maximum throughput is limited (refer FIG. 4*a*), which consequently affects the observed response time.

In another embodiment, structured workflow resource pattern analysis classifies the improvements provided through various resource patterns. Table 4 provides the structured performance improvements provided by various workflow resource patterns, per unit increase in industrial warehouse automation, currency Level Concurrency Level >=100: Automation Resource Scale Up Concurrency Level >=200: Automation Resource Scale Out Concurrency Level >=350: Automation Resource Hybrid Scale Default: Automation Resource Default End Case Such rules are a starting point to aid in automated runtime adaptation in Industry 4.0 deployments. Mapping this back to Table 1, an efficient set of patterns to consider in the Scale Out case would be: 5. Separation of Duties (Task creation/allocation)→13. Distribution by Offer→Multiple Resources (Push Pattern)→24. System-Determined Work Queue Content (Execution Pattern)→31. Stateless Reallocation (Detour Pattern). Similarly, for the Hybrid Scale case, the patterns to consider are: 2. Role-Based Allocation (Task creation/allocation)→25. Resource-Determined Work Queue Content (Pull Pattern)→42. Simultaneous Execution (Execution Pattern)→43. Additional Resources (Detour Pattern).

The written description describes the subject matter herein to enable any person skilled in the art to make and use the embodiments. The scope of the subject matter embodi-

TABLE 4

| Scenario | Workflow resource pattern | Maximized Throughput | Maximized Concurrency | Bottleneck Response | Cost Per Transactions |
|---|---|---|---|---|---|
| Single Class, Constant Service demand, low p, | Single (1 human) | 15 Trans/Hour | 74 | 5 hours | 50 units |
| | Scale Out (2 humans) | +140% | +117% | −40% | −40% |
| | Scale Up (1 robotic) | +113% | +8% | −60% | −70% |
| | Hybrid Scale (1 human, 1 robot) | +148% | +134% | −40% | −40% |
| Single Class, Constant Service demand, High p, | Single (1 human) | 55 Trans/Hour | 140 | 2.3 hours | 14 units |
| | Scale Out (2 humans) | +150% | +130% | −37% | −38% |
| | Scale Up (1 robotic) | +122% | +25% | −57% | −78% |
| | Hybrid Scale (1 human, 1 robot) | +159% | +130% | −37% | −45% |
| Single Class, load dependent Service demand, low p, | Single (1 human) | 20 Trans/Hour | 60 | 3 hours | 28 units |
| | Scale Out (2 humans) | +500% | +170% | −44% | −47% |
| | Scale Up (1 robotic) | +100% | +16% | −67% | −82% |
| | Hybrid Scale (1 human, 1 robot) | +400% | +100% | −42% | −47% |
| Scale Out Class, Constant Service demand, low p, | Single (1 human) | 7.5 Trans/Hour | 120 | 16 hours | 100 units |
| | Scale Out (2 humans) | +130% | +98% | 354% | −35% |
| | Scale Up (1 robotic) | +127% | +21% | −53% | −70% |
| | Hybrid Scale (1 human, 1 robot) | +142% | +112% | −35% | −40% |

The single class queueing mode with constant loads, throughput may be improved between 100-200% and latency ~60% while still reducing cost per transaction by ~70%. This improvement is higher in the case of load dependent, specially with the Scale Out class queueing mode providing significant improvements in throughput and cost per Rules for runtime adaptation techniques, for instance based on monitored concurrency levels, are given in the pseudo-code below (referring to the outputs provided in FIG. 6*b*): Input Concurrency Level Case based on Conments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of automating workflow resource pattern, where analyzing performance of the workflow resource pattern is still an emerging solution. The embodiment, thus provides a method for evaluating performance of workflow resource patterns in the industrial warehouse. The embodiments robustly analyses end to end performance of the workflow resource pattern which maximizes throughput, improvises accuracy, increasing efficiency thereby minimizing cost. The system outperforms performance when automation entails parallel processing, superior service demands or delegation of workload. This provides accurate characterization of automated workflow resource patterns for higher concurrency loads with multiple classes load dependent service demands. Accurate characterization of the resource patterns for the end-to-end performance is the necessary to achieve dynamic reconfiguration for performing complex tasks in the industrial warehouse.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A processor implemented method for evaluating performance of workflow resource patterns, the method comprising:

receiving, by a processor (104), a request for executing a plurality of tasks in an industrial warehouse;

disintegrating, by the processor (104), each task from the plurality of tasks into a plurality of subtasks; and dynamically, generating, by the processor (104), a plurality of workflow resource patterns corresponding to the plurality of sub tasks, wherein each workflow resource pattern is associated with a set of resource agents selected from a plurality of resource agents based on an availability of the plurality of resource agents for executing the task;

mapping, by the processor (104), each workflow resource pattern to a queueing mode among a plurality of queueing modes of a queueing station in a hybrid queueing network model for execution of the task, wherein mapping is based on a completion probability value and a think time, wherein the think time is the idle time spent by the plurality of resource agents in the hybrid queueing network model, and wherein the queueing mode of the queueing station comprises a single class queueing mode, a scale out class queueing mode, a scale up class queueing mode and a hybrid scale class queueing mode, wherein the scale out class queueing mode comprises parallelizing the plurality of tasks to the plurality of resource agents, wherein the scale up class queueing mode comprises replacing the hybrid queueing mode with a superior one with a higher throughput and wherein the hybrid scale out queueing mode parallelizes the plurality of tasks and replaces at least one of the plurality of resource agents among the plurality of resource agents with superior ones;

evaluating, by the processor (104), performance of each workflow resource pattern that is mapped to the single class queueing mode or to the scale out class queueing mode, wherein the performance is estimated by computing a response time and a queue length for each workflow resource pattern, wherein the performance of each workflow resource pattern is analyzed based on the throughput, a service demand and a concurrency for the workflow resource pattern; and replacing, by the processor (104), the queuing mode mapped with the workflow resource pattern with another queuing mode of the queueing station, wherein the queueing mode is replaced dynamically based on the performance evaluated.

2. The method as claimed in claim 1, wherein the completion probability value is a pre-defined value and wherein the pre-defined value is a lower value when corresponding to a closed hybrid queueing network model and a higher value when corresponding to an open hybrid queueing network model.

3. The method as claimed in claim 1, wherein computing the response time and the queue length for each workflow resource pattern mapped to the single class queueing mode comprises:

obtaining a plurality of attributes for each workflow resource pattern, wherein the plurality of attributes comprises a set of queuing stations, a corresponding service demand, a visit count, the think time, a number of concurrent users and the completion probability value;

computing the response time, wherein the response time is the product of the constant service demand and the queue length; and computing the queue length, wherein the queue length is the product of completion probability value, the throughput, the response time and the visit counts.

4. The method as claimed in claim 1, wherein computing the response time and the queue length for each workflow resource pattern mapped to the scale out class queueing mode comprises:

obtaining, a plurality of attributes for each workflow resource pattern, wherein the plurality of attributes comprises the set of queuing stations, the corresponding service demand, a number of concurrent users, a visit count, the think time, a number of classes with population of each class and the completion probability value;

computing the response time, wherein the response time is the product of the constant service demand and the queue length; and computing the queue length, wherein the queue length is the product of completion probability value and the summation of the throughput, the response time and the visit counts.

5. A system (100) for evaluating performance of workflow resource patterns, wherein the system (100) comprises:

a memory (102) storing instructions;

one or more Input/Output (I/O) interfaces (106); and one or more processors (104) coupled to the memory (102) via the one or more I/O interfaces (106), wherein the processor (104) is configured by the instructions to:

receive, a request for executing a plurality of tasks;

disintegrate, each task from the plurality of tasks into a plurality of subtasks; and dynamically, generating, a plurality of workflow resource patterns corresponding to the plurality of sub tasks, wherein each workflow resource pattern is associated with a set of resource agents selected from a plurality of resource agents based on an availability of the plurality of resource agents for executing the task;

mapping, each workflow resource pattern to a queueing mode among a plurality of queueing modes of a queueing station in a hybrid queueing network model for execution of the task, wherein mapping is based on a completion probability value and a think time, wherein the think time is the idle time spent by the plurality of resource agents in the hybrid queueing network model, and wherein the queueing mode of the queueing station comprises a single class queueing mode, a scale out class queueing mode, a scale up class queueing mode and a hybrid scale class queueing mode, wherein the scale out class queueing mode comprises parallelizing the plurality of tasks to the plurality of resource agents, wherein the scale up class queueing mode comprises replacing the hybrid queueing mode with a superior one with a higher throughput and wherein the hybrid scale out queueing mode parallelizes the plurality of tasks and replaces at least one of the plurality of resource agents among the plurality of resource agents with superior ones;

evaluating, performance of each workflow resource pattern that is mapped to the single class queueing mode or to the scale out class queueing mode, wherein the performance is estimated by computing a response time and a queue length for each workflow resource pattern, wherein the performance of each workflow resource pattern is analyzed based on the throughput, a service demand and a concurrency for the workflow resource pattern; and replacing, the queuing mode mapped with the workflow resource pattern with another queuing mode of the queueing station, wherein the queueing mode is replaced dynamically based on the performance evaluated.

6. The system (100) as claimed in claim 5, wherein the completion probability value is a pre-defined value and wherein the pre-defined value is a lower value when corresponding to a closed hybrid queueing network model and a higher value when corresponding to an open hybrid queueing network model.

7. The system (100) as claimed in claim 5, wherein computing the response time and the queue length for each workflow resource pattern mapped to the single class queueing mode comprises:

obtaining a plurality of attributes for each workflow resource pattern, wherein the plurality of attributes comprises a set of queuing stations, a corresponding service demand, a visit count, the think time, a number of concurrent users and the completion probability value;

computing the response time, wherein the response time is the product of the constant service demand and the queue length; and computing the queue length, wherein the queue length is the product of completion probability value, the throughput, the response time and the visit counts.

8. The system (100) as claimed in claim 5, wherein computing the response time and the queue length for each workflow resource pattern mapped to the scale out class queueing mode comprises:

obtaining, a plurality of attributes for each workflow resource pattern, wherein the plurality of attributes comprises the set of queuing stations, the corresponding service demand, a number of concurrent users, a visit count, the think time, a number of classes with population of each class and the completion probability value;

computing the response time, wherein the response time is the product of the constant service demand and the queue length; and computing the queue length, wherein the queue length is the product of the completion probability value and the summation of the throughput, the response time and the visit counts.

9. One or more non-transitory machine readable information storage mediums comprising one or more instructions which when executed by one or more hardware processors perform actions comprising:

receiving, by a processor (104), a request for executing a plurality of tasks;

disintegrating, by the processor (104), each task from the plurality of tasks into a plurality of subtasks; and dynamically, generating, by the processor (104), a plurality of workflow resource patterns corresponding to the plurality of sub tasks, wherein each workflow resource pattern is associated with a set of resource agents selected from a plurality of resource agents based on an availability of the plurality of resource agents for executing the task;

mapping, by the processor (104), each workflow resource pattern to a queueing mode among a plurality of queueing modes of a queueing station in a hybrid queueing network model for execution of the task, wherein mapping is based on a completion probability value and a think time, wherein the think time is the idle time spent by the plurality of resource agents in the hybrid queueing network model, and wherein the queueing mode of the queueing station comprises a single class queueing mode, a scale out class queueing mode, a scale up class queueing mode and a hybrid scale class queueing mode wherein the scale out class queueing mode comprises parallelizing the plurality of tasks to the plurality of resource agents, wherein the scale up class queueing mode comprises replacing the hybrid queueing mode with a superior one with a higher throughput and wherein the hybrid scale out queueing mode parallelizes the plurality of tasks and replaces at least one of the plurality of resource agents among the plurality of resource agents with superior ones;

evaluating, by the processor (104), performance of each workflow resource pattern that is mapped to the single class queueing mode or to the scale out class queueing mode, wherein the performance is estimated by computing a response time and a queue length for each workflow resource pattern, wherein the performance of each workflow resource pattern is analyzed based on the throughput, a service demand and a concurrency for the workflow resource pattern; and replacing, by the processor (104), the queuing mode mapped with the workflow resource pattern with another queuing mode of the queueing station, wherein the queueing mode is replaced dynamically based on the performance evaluated.

10. The one or more non-transitory machine readable information storage mediums of claim 9, wherein the completion probability value is a pre-defined value and wherein the pre-defined value is one of a lower value when corresponding to a closed hybrid queueing network model and a higher value when corresponding to an open hybrid queueing network model.

11. The one or more non-transitory machine readable information storage mediums of claim 9, wherein computing the response time and the queue length for each workflow resource pattern mapped to the single class queueing mode comprises:

obtaining a plurality of attributes for each workflow resource pattern, wherein the plurality of attributes comprises a set of queuing stations, a corresponding service demand, a visit count, the think time, a number of concurrent users and the completion probability value;

computing the response time, wherein the response time is the product of the constant service demand and the queue length; and computing the queue length, wherein the queue length is the product of completion probability value, the throughput, the response time and the visit counts.

12. The one or more non-transitory machine readable information storage mediums of claim 9, wherein computing the response time and the queue length for each workflow resource pattern mapped to the scale out class queueing mode comprises:

obtaining, a plurality of attributes for each workflow resource pattern, wherein the plurality of attributes comprises the set of queuing stations, the corresponding service demand, a number of concurrent users, a visit count, the think time, a number of classes with population of each class and the completion probability value;

computing the response time, wherein the response time is the product of the constant service demand and the queue length; and computing the queue length, wherein the queue length is the product of the completion probability value and the summation of the throughput, the response time and the visit counts.

\* \* \* \* \*